US 7,378,063 B1

(12) United States Patent
Wyles

(10) Patent No.: US 7,378,063 B1
(45) Date of Patent: May 27, 2008

(54) RADIO FREQUENCY HYDROGEN AND OXYGEN GENERATOR AND METHOD

(76) Inventor: Walter Eugene Wyles, 5811 Garden Lakes, Magestic, Bradenton, FL (US) 34203

( * ) Notice: Subject to any disclaimer, the term of this patent is extended or adjusted under 35 U.S.C. 154(b) by 167 days.

(21) Appl. No.: 11/435,971

(22) Filed: May 17, 2006

Related U.S. Application Data

(63) Continuation-in-part of application No. 10/971,517, filed on Oct. 22, 2004, now abandoned.

(51) Int. Cl.
*B01J 19/08* (2006.01)
(52) U.S. Cl. .................. 422/186.29; 422/186
(58) Field of Classification Search .............. 422/186, 422/186.29; 423/648.1
See application file for complete search history.

(56) References Cited

U.S. PATENT DOCUMENTS

2003/0234172 A1* 12/2003 Arthur et al. .......... 204/157.15

FOREIGN PATENT DOCUMENTS

JP 09-298189 A * 11/1997

* cited by examiner

*Primary Examiner*—Kishor Mayekar
(74) *Attorney, Agent, or Firm*—Dorothy S. Morse

(57) ABSTRACT

A method and device for generating hydrogen and oxygen from water using the heterodyning or impacting of two radio frequencies on the surface of water in a shielded and grounded enclosure, with separation and collection of gases accomplished by a superimposed manifold. One radio frequency is higher than the other, one typically in the ultra high radio frequency bandwidth (UHF) and the other typically in the very high radio frequency bandwidth (VHF). The heterodyning creates two additional radio frequencies that are also used to fracture the water's molecular bonds. The method is clean, odorless, silent, and environmentally friendly, with no residue, fumes, or other unwanted byproducts. Optionally, water filtering means, water heating means, saltwater, and/or fresh water can be used. A water spray can also be used to increase the water surface area available for bond fracture by the radio frequency disturbance.

15 Claims, 4 Drawing Sheets

RADIO FREQUENCY HYDROGEN AND OXYGEN GENERATOR AND METHOD

CROSS-REFERENCES TO RELATED APPLICATIONS

This application is a continuation in part of the utility application filed by the same inventor on Oct. 22, 2004, for substantially the same subject matter, and which was entitled "Radio Frequency Hydrogen and Oxygen Generator and Method" and given a Serial Number of 10/971,517, now abandoned, by the U.S. Patent & Trademark Office. Benefit of this previously filed application is herein requested.

BACKGROUND OF THE INVENTION

1. Field of the Invention

The invention relates to the field of gas generation and its collection/separation for other uses, specifically to a device and method for heterodyning or impacting two radio frequencies against one another, and also against a water surface or multiple water surfaces, within a shielded and grounded enclosure receiving a regulated supply of filtered water. The heterodyning of the two original radio frequencies results in the creation of two additional radio frequencies, one at the sum of the two frequencies mixed and the other at their difference. Both original radio frequencies used in the present invention enclosure are created from a crystal oscillator signal that has been directed through at least one circuit containing a doubler, a tripler, and an amplifier, with a separate antenna bringing each enhanced radio frequency into the heterodyning enclosure. One of the two original radio frequencies used in the present invention will always be higher than the other, with one typically in the ultra high radio frequency bandwidth (UHF) and the other typically in the very high radio frequency bandwidth (VHF). It is the resulting mixture of four high radio frequencies, each with an acute wave form that overlaps the other three radio frequencies with random spacings, which is used in the present invention to disrupt molecular bonds in the water and free its hydrogen and oxygen components. A manifold above the shielded enclosure, and in fluid communication with it, is used to collect and separate the resulting hydrogen and oxygen gas. Further testing of the present invention will determine optimum oscillator crystal size and radio frequency combinations appropriate to specific applications. Uses of the present invention are many; such as, but not limited to, fuel cell electric power generators, the fuel cell car, improved combustion in the carbureting of fuel in gasoline and diesel engines, and to increased miles per gallon fuel consumption in gasoline and diesel engines.

BACKGROUND OF THE INVENTION

2. Description of Related Art

Electrolysis is commonly used to provide pure hydrogen. It involves the immersion of two electrified probes into a prepared brine of sodium hydroxide and water. One electrode of nickel-plated iron is paired with one iron electrode. When current is passed, the water decomposes as bubbles of hydrogen gas leave the cathode and oxygen bubbles leave the anode. A significant disadvantage of electrolysis is that caustic soda brine used is not environmentally friendly. In contrast, the present invention generator and method are much more environmentally friendly than electrolysis. The present invention does not require a hazardous liquid medium with special handling needs, leave residue, or create noxious fumes. It also provides a clean and odorless process that is conducted without noise, wherein two antennae each provide a different radio frequency within a shielded and grounded enclosure, one typically in the ultra high radio frequency bandwidth (UHF) and the other typically in the very high radio frequency bandwidth (VHF). The impinging of the two different radio frequencies against a water surface in the enclosure and against one another creates two additional radio frequencies and results in the heterodyning of four high radio frequencies against the water in the enclosure which overlap with random spacings, whereby the water's molecular bonds become fractured and its gaseous hydrogen and oxygen components released, which can be separated and collected for productive use. The four radio frequencies include the original two radio frequencies provided by the two antennae, as well as one that is equivalent to the sum of the original two radio frequencies and another equivalent to the difference between them.

BRIEF SUMMARY OF THE INVENTION

The primary objective of the present invention is to use radio frequency energy to break ion bonds in water molecules so that the hydrogen and oxygen gas created can be collected for other productive use. It is also an objective of the present invention to provide means for generating hydrogen and oxygen gas from water that is more environmentally friendly than processes currently in common use. Another objective of the present invention to provide means for generating hydrogen and oxygen gas from water that is sufficiently cost effective for widespread use. It is a further objective of the present invention to provide a means for generating hydrogen and oxygen gas from water using radio frequencies that has sufficient radio frequency containment for adequate protection of radio communication and safe use. It is also an objective of the present invention to provide a hydrogen and oxygen generating unit that can be made in multiple sizes for differing applications. Another objective of the present invention is to provide a hydrogen and oxygen generating unit that is compact, relatively lightweight, and otherwise adaptable for use in a moving vehicle.

The present invention process begins with two radio frequencies, one lower than the other, which are generated by a crystal oscillator located in a shielded and grounded electronics chassis. After the original oscillator signal is modified via at least one doubler, at least one tripler, and at least one amplifier, two radio frequencies are created with one typically in the ultra high radio frequency bandwidth (UHF) and the other typically in the very high radio frequency bandwidth (VHF). Each signal is then carried by a separate shielded cable to a shielded and grounded enclosure that receives a regulated supply of filtered water. Either salt water or fresh water may be used in the enclosure. Further, the water may be provided in the enclosure in the form of droplets to increase the available amount of surface area subject to the heterodyning forces. The two original radio frequencies created from the crystal oscillator signal impinge on the water surface or surfaces, and upon each other, whereby heterodyning results in the creation of two additional radio frequencies, one being equivalent to the sum of the two original radio frequencies and the other equivalent to the difference between them. For example, if the crystal oscillator originally used is 20 MHZ, the first and lower of the two original radio frequencies used in the present invention enclosure will be created in a circuit that doubles and triples the oscillator signal, resulting in a very high radio frequency bandwidth (VHF) of 120 MHZ (20 MHZ×2=40 MHZ and

40 MHZ×3=120 MHZ)

In addition, the second of the original radio frequencies used in the present invention starts with the output of the first tripler, which is 120 MHZ. This output is then doubled and tripled in a separate circuit, resulting in an ultra high radio frequency bandwidth (UHF) of 720 MHZ (120 MHZ×2=240 MHZ;

and

240 MHZ×3=720 MHZ)

The third and fourth additional radio frequencies found in the shielded and grounded enclosure of the present invention and used to fracture water molecules, then become 840 MHZ which is the sum of the two original radio frequencies brought into the enclosure via shielded cables (120 MHZ+720 MHZ=840 MHZ)

and 600 MHZ which is the difference between the two original radio frequencies (720 MHZ−120 MHZ=600 MHZ the third and fourth additional radio frequencies both being products of the heterodyning action and are not introduced into the enclosure through antennae, as would be the two original radio frequencies used in this example of 120 MHZ and 720 MHZ, respectively. The geometry of a single frequency sound or radio wave traveling through air is sinusoidal. In the ultra high radio frequency bandwidth (UHF) and the very high radio frequency bandwidth (VHF) used in the present invention, as well as the wave forms of the third and fourth additional radio frequencies produced in the present invention by heterodyning, finite spacing exists between acute wave forms. Once heterodyning produces the two additional radio frequencies, the finite spacings in all the four radio frequencies within the enclosure randomly interact with one another and overlap to become even more finite, thereby producing some waveforms with sufficiently small spacings that are able to interfere with or disrupt the ion bond between the hydrogen and oxygen atoms in the water molecules to which they are directed, releasing gases that can be collected separately for other uses. As a preferred option, a water spray may be added to increase the available amount of water surface subject to the heterodyning forces and thereby increase the resulting gas volume collected. The gases are collected through the top of the enclosure to which a manifold is connected that is sufficiently elongated with internal openings that cause separation of the hydrogen and oxygen gas molecules. Since the present invention process is not conducted at sufficient elevated temperature or pressure to generate water vapor, which is undesirable in that it would contaminate and interfere with the separation of hydrogen and oxygen gases as they migrate upward and move toward the manifold, most of the gas accumulating at the top of the manifold would be the lightest gas (hydrogen) with the heavier gas (oxygen) accumulating below it. The relative weight difference between oxygen and hydrogen, with oxygen being sixteen times heavier than hydrogen, facilitates the gas separation, and if the resulting purity of gases collected is not sufficient for the intended application, gas migration holes in the internal configuration of the manifold, or other means can be used to further separate the collected gases. The present invention process does not leave a residue or fumes. It is clean and odorless, and is conducted without noise. Uses of the present invention are many; such as, but not limited to, fuel cell electric power generators, the fuel cell car, improved combustion in the carbureting of fuel in gasoline and diesel engines, and to increased miles per gallon fuel consumption in gasoline and diesel engines.

DETAILED DESCRIPTION OF THE INVENTION

The present invention includes a method and device for generating hydrogen and oxygen from water in a shielded and grounded enclosure 1A using the heterodyning or impacting of two radio frequencies, one higher than the other (respectively in the UHF and VHF bandwidths), against one another and the water surface to fracture its ion bonds. Microwaves would not be used, as they generate heat. The present invention provides a clean, odorless, and silent process, with no residue, fumes, or other unwanted by-products. Saltwater or fresh water can be used in the heterodyning enclosure. An optional sprayer 5A can be used to increase the amount of water surface are in enclosure 1A for gas generation use.

The most preferred embodiment of the present invention uses the following components, further details of which are provided in the figure descriptions.

| ITEM | DESCRIPTION |
|---|---|
| 1A | SHIELDED CONTAINER WITH METALLIC GASKET. (SCREEN SHIELDING ON INSIDE OF TOP, BOTTOM & SIDES IS GROUNDED AND PREFERABLY MADE OF BRONZE.) |
| 2A | LOWER FREQUENCY ANTENNA (A MINIMUM OF ONE IS REQUIRED) (EXAMPLE: ¼ WAVELENGTH ANTENNA HAVING A LENGTH DIMENSION OF APPROXIMATELY 24.6 INCHES THAT IS FORMED INTO A CIRCLE WITH AN 8-INCH INSIDE DIAMETER AND A ONE-INCH GAP AT END; MADE FROM #6 GAGE COPPER WIRE FOR RADIATING 120 MEGAHERTZ AT 7 WATTS OF POWER) |
| 3A | HIGHER FREQUENCY ANTENNA (A MINIMUM OF ONE IS REQUIRED) (EXAMPLE: ½ WAVELENGTH ANTENNA HAVING A LENGTH DIMENSION OF APPROXIMATELY 8.2 INCHES FORMED INTO A CIRCLE WITH A 2.8-INCH INSIDE DIAMETER A ONE-INCH GAP BETWEEN THE ENDS; MADE FROM #6 GAGE COPPER WIRE FOR RADIATING 720 MEGAHERTZ AT 7 WATTS OF POWER) |
| 4A | TOP COVER LATCHES |
| 5A | PLASTIC TUBE FOR WATER SPRAY CURTAIN |
| 6A | WATER LEVEL CONTROL |
| 7A | TOP, BOTTOM, & SIDE MESH/SCREEN ENCLOSURE |
| 8B | TOP COVER |
| 8B-1 | CENTER COVER |
| 9B | BASE |
| 10B | ELECTRONICS CHASSIS WITH CONTROL PANEL. |
| 11B | WATER SUPPLY, HEATER, & PUMP |
| 12B | SHIELDED COAXIAL CABLE INPUTS |
| 13B | MANIFOLD |
| 14B | HYDROGEN OUTLET |
| 15B | OXYGEN OUTLET |
| 16B | INPUT TO POWER SUPPLY 120V AC, 60 HZ OR 12V DC |
| 17B | POWER SELECTOR SWITCH, 3 POSITION: OFF, 120V 60 HZ AC, OR 12V DC WITH INDICATOR LIGHTS |
| 18B | LINE FUSES, TWO, 1-120 V AND 1-12 V |
| 19B | LOWER FREQUENCY RF WATT METER (VHF) |
| 20B | HIGHER FREQUENCY RF WATT METER (UHF) |
| 21B | GROUND WIRE |
| 22B | CONDUCTIVE GASKET |
| 23B | ANTENNAE SUPPORT BRACKET WITH TWO ½" DIAMETER CLAMPS AND SCREWS |
| 24B | RIGHT ANGLE (90 DEGREES) COAXIAL CABLE ADAPTERS, TWO |

Figure 1:
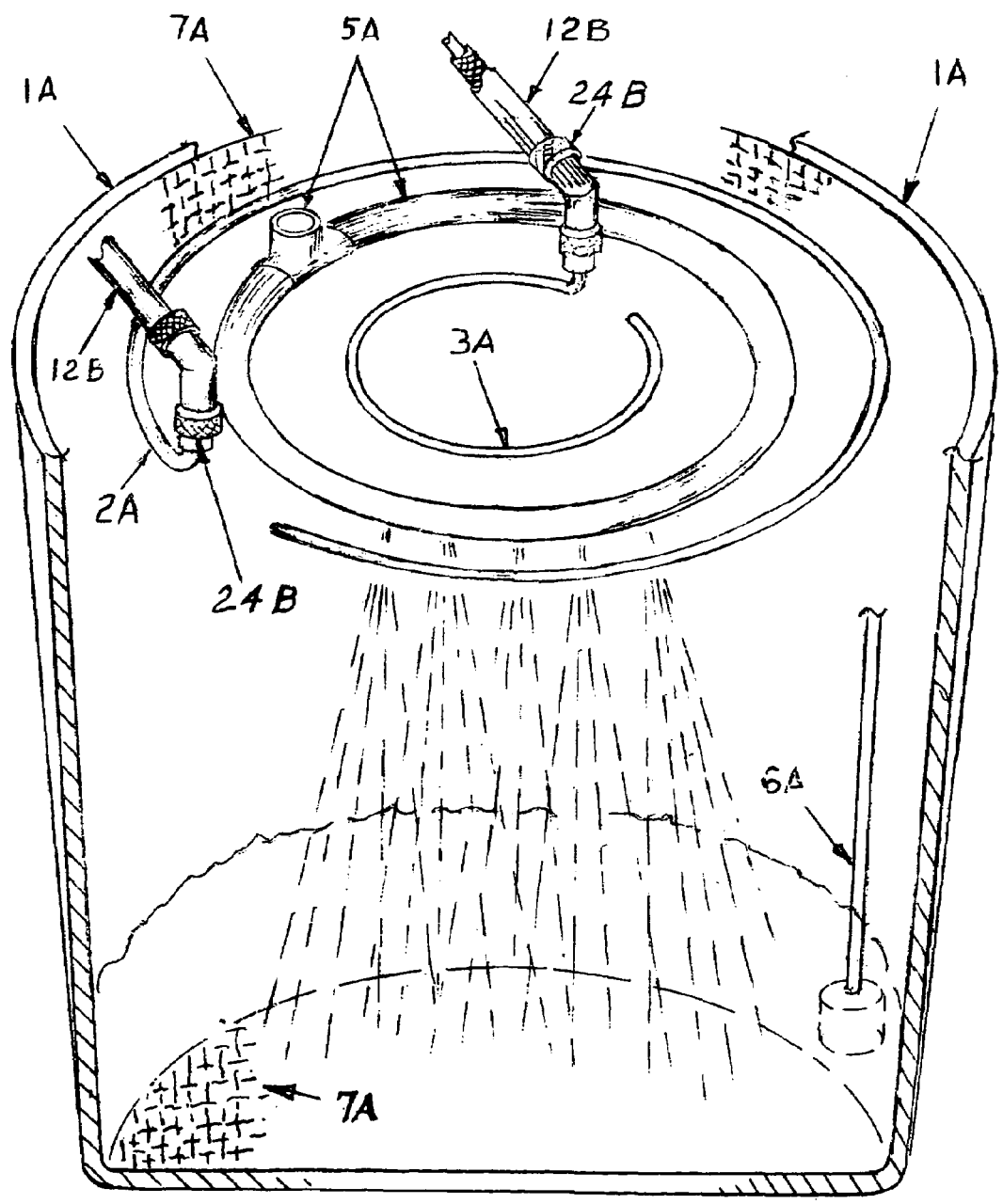
FIG. 1 is a sectional view of the most preferred embodiment of the present invention heterodyning enclosure having one very high frequency antenna (VHF) connected to a coaxial cable, one ultra high frequency antenna (UHF) connected to a coaxial cable, a screen/mesh shield on the sides and bottom of enclosure, and a tube adapted for providing a water spray curtain.
Figure 2:
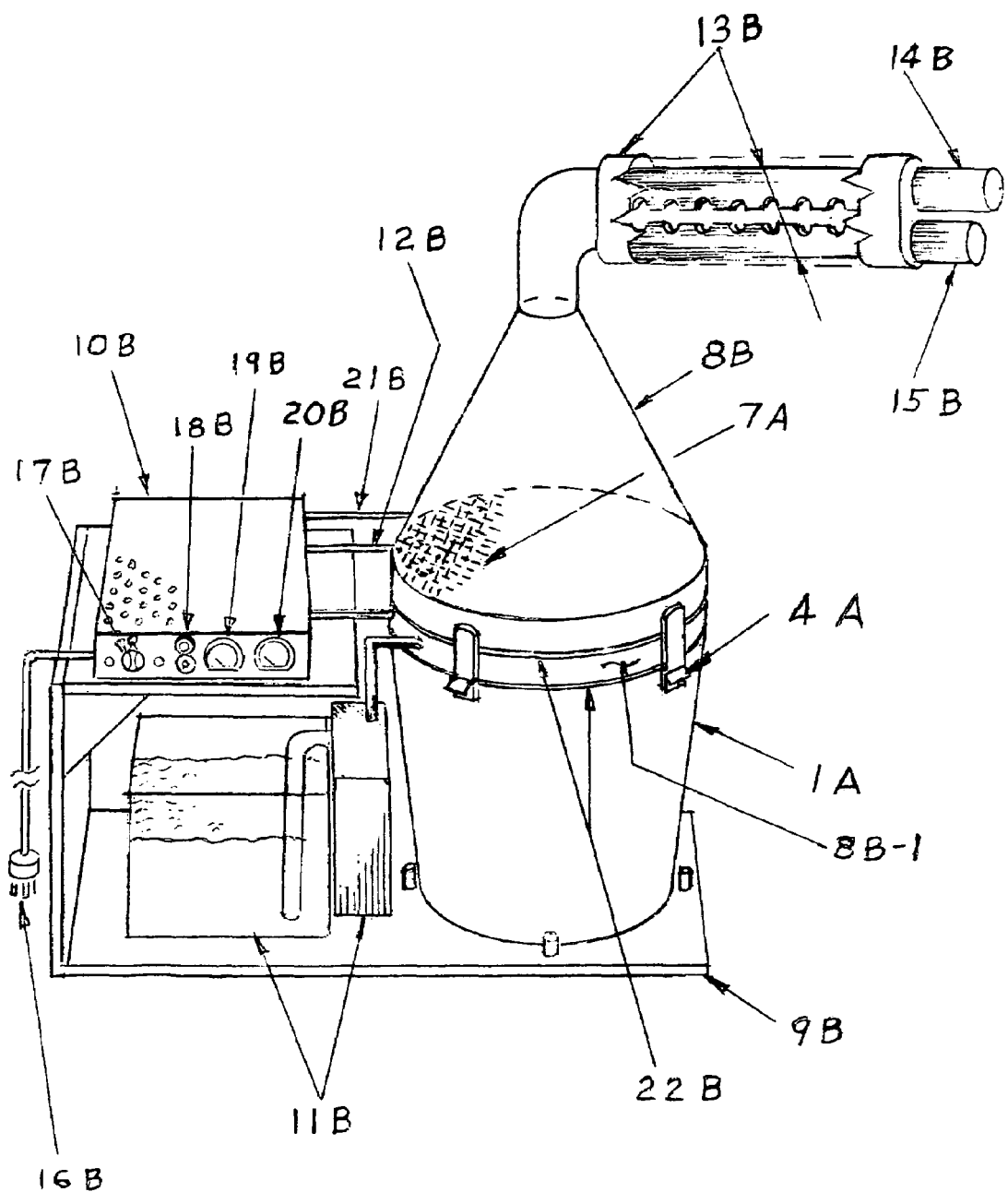
FIG. 2 is a perspective view of the most preferred embodiment present invention having a shielded container with a removable top cover connected to a gas collection/separation manifold, with the high frequency antenna (UHF) and the low frequency antenna (VHF) shown in FIG. 1 within the heterodyning enclosure being connected to an electronics chassis via shielded coaxial cables that is adapted for providing the two original radio frequencies needed within the enclosure, and the enclosure also being in fluid communication with a reservoir that provides it with filtered water.

FIG. 1 shows enclosure 1A having a hollow interior space. Although not limited there to, enclosure 1A may be made from plastic. Size is not critical for enclosure 1A, and it may have an interior volume of approximately five gallons. The use of spray tube 5A is optional, with the water droplets it creates providing more surface area for radio frequency impinging and increased gas generation. The temperature of the water entering enclosure 1A may also be elevated to increase gas production. Although not shown it is contemplated for enclosure 1A to have a center support bracket 23B for tube 5A, and to support antennae 2A and 3A in the approximate positions shown in FIG. 1, above the surface of the water in enclosure 1A, the water surface being visible as a wavy line below antennae 2A and 3A but not having a numerical designation. However, since the shape of the center support bracket is not critical and may have any configuration that effectively supports tube 5A as well as antennae 2A and 3A, the center support bracket 23B was omitted from FIG. 1 to provide a clear view of critical components. Instead, the most preferred embodiment of support bracket 23B is separately illustrated in FIG. 1. FIG. 1 also shows a water level control 6A positioned adjacent to one side of enclosure 1A. The configuration and positioning of water level control 6A is not limited to that shown in FIG. 1, and it may comprise any size, shape, or function that when impacted by radio frequencies remains able to maintain collected water in enclosure 1A at a desired level. FIG. 1 further shows two antennae 2A and 3A, positioned near to the top of enclosure 1A, above the surface of the water also in enclosure 1A. It is contemplated for high frequency antennae 3A to transmit radio frequencies in the ultra high radio frequency bandwidth (UHF) and for the lower frequency antenna 2A to transmit radio frequencies in the very high radio frequency bandwidth (VHF). Each is connected to the electronics chassis 10B by a different a right angle adapter 24B connected to a different shielded coaxial cable input 12B. FIG. 1 shows enclosure 1A having mesh/screen 7A on its side and bottom surfaces to block radio frequencies and redirect them back within enclosure 1A. Although not shown in FIG. 1, FIG. 2 shows the top surface of screen 7A being connected to ground wire 21B. In the most preferred embodiment of enclosure 1A, the top surface of screen 7A is positioned above high frequency antenna 3A and low frequency antenna 2A. FIG. 1 shows enclosure 1A being substantially cylindrical, although having a downwardly directed taper. However, the configuration of enclosure 1A is not critical and not limited to that shown. Also, although the positioning of higher frequency antenna 3A, water delivery tube 5A, and lower frequency antenna 2A shown in FIG. 1 is preferred, it is not critical.

FIG. 2 shows enclosure 1A positioned upon a rigid base 9B and connected to a top cover 8B and center cover 8B-1, which are both sealed with conductive gasket 22B. FIG. 2 also shows one end of a manifold 13B communicating wit the top end of top cover 8B. Extending from the opposing end of manifold 13B, FIG. 2 shows hydrogen carrying conduit 14B and an oxygen carrying conduit 15B. The hydrogen carrying conduit 14B is positioned above oxygen carrying conduit 15B to facilitate gas separation, since hydrogen is lighter in weight than oxygen. Holes between hydrogen carrying conduit 14B and oxygen carrying conduit 15B further facilitate gas separation. Latches 4A securely connect top cover 8B and center cover 8B-1 to the upper end of enclosure 1A with center cover 8B-1 being positioned between top cover 8B and enclosure 1A. However, the use of latches 4A are not critical to the present invention, and any fastening device that is secure in its connection and not easily opened by casual or inadvertent contact is contemplated for use in the present invention to secure top cover 8B, center cover 8B-1, and enclosure 1A. In addition, FIG. 2 shows mesh/screen 7A connected between top cover 8B and enclosure 1A. Adjacent to enclosure 1A and also supported by base 9B, FIG. 2 shows a reservoir, and pump assembly 11B with optional heater and its connected pipe or tube (not separately numbered) that extends through the side of enclosure 1A. Although it is contemplated for the saltwater or fresh water entering enclosure 1A to be filtered, and perhaps temperature controlled, the individual filtering apparatus would be of common design and is not shown. No heating unit is shown for the same reason. The size, configuration, and positioning of reservoir and pump 11B, and its connected pipe or tube, may be different than that shown in FIG. 1 as long as it is able to deliver the amount of water required by enclosure 1A for hydrogen and oxygen generation. Above reservoir 11B, FIG. 2 shows an electronics chassis with control panel 10B. Although not shown, it is contemplated for electronics chassis 10B to be shielded and grounded. It is electronics chassis 10B that houses the crystal oscillator shown in FIG. 3 that is used for creation of the two original radio frequencies directed into enclosure 1A and which are used for fracturing molecular bonds on the surface of water in enclosure 1A. Several shielded coaxial cables 12B extend between electronics chassis 10B and enclosure 1A, and a power cord and plug 16B extends downward from electronics chassis 10B for connection to a remote power source or municipal power supply (not shown). FIG. 2 shows the control panel on electronics chassis 10B having a selector switch 17B moveable between "ON" and "OFF" positions, with indicator lights to show the type of power source being utilized, either 120 V/60 HZ AC or 12 V DC. Two line fuses 18B protect circuits from overload. In addition, FIG. 2 shows the control panel on electronics chassis 10B having one lower frequency RF watt meter identified as 19B and one higher frequency RF watt meter identified as 20B, which are used to monitor the antenna loading in shielded enclosure 1A. The relative positioning on the control panel of electronics chassis 10B is not critical for selector switch 17B, line fuses 18B, lower frequency RF watt meter (VHF), and higher frequency RF watt meter 20B (UHF). Also, the size and configuration of electronics chassis with control panel 10B, as well as switch 17B, fuses 18B, and meters 19B and 20B, may be different than that shown in FIG. 2, as long as each is able to fulfill its required function.

Figure 3:
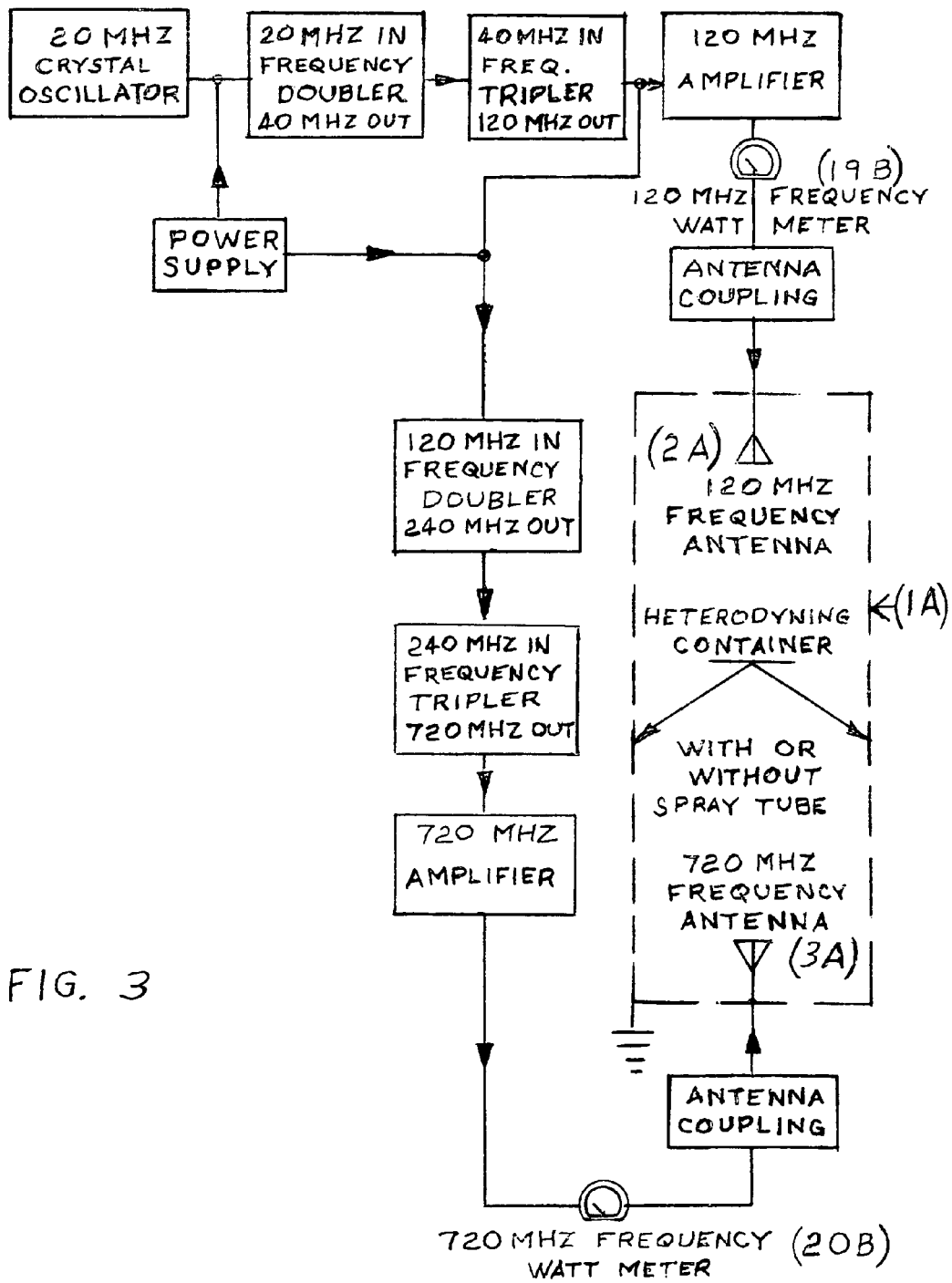
FIG. 3 is a block diagram of circuits used in the most preferred embodiment of the present invention to produce the two original radio frequencies, with the lower of the two original radio frequencies created from a crystal oscillator signal that has been directed sequentially to a doubler circuit, a tripler circuit, an amplifier circuit, an antenna coupling, and finally to a lower frequency antenna, with the higher of the two original radio frequencies created from a portion of the output from the lower frequency tripler circuit that is tapped off before the lower frequency amplifier and subsequently directed to a doubler circuit, a tripler circuit, an amplifier circuit, an antenna coupling, and finally to a higher frequency antenna, with lower and higher frequency watt meters monitoring antennae power and an example of megahertz numbers provided for understanding and reference.

FIG. 3 shows the circuit required for successful function of the most preferred embodiment of the present invention. As shown in FIG. 3, it is contemplated for a power supply to provide energy for components within electronics chassis 10B. One example of potential radio/signal frequency numbering is used in FIG. 3 for understanding and reference, and the same frequency numbering is provided below with additional explanation. However, it is to be understood that UHF, VHF, and other radio/signal frequencies other that those identified herein and in FIG. 3 can also be used as a part of the present invention. A crystal oscillator, identified in FIG. 3 as 20 MHZ, can be used within electronics chassis 10B to create the two original radio frequencies of 120 MHZ and 720 MHZ suggested by way of example for introduction into the heterodyning enclosure 1A. A frequency doubler with a 40 MHZ output, followed by a frequency tripler with a 120 MHZ output, are then used for enhancement, with the output of the frequency tripler thereafter being split into two components. The lower frequency component (VHF) of 120 MHZ is then directed to a lower frequency amplifier, and then through lower frequency RF watt meter 19B, after which a shielded coaxial cable 12B transmits the lower radio frequency of 120 MHZ (VHF) to lower frequency one-forth wave length circular antenna 2A within center cover 8B-1 for impinging on the surface or surfaces of water within enclosure 1A. The higher frequency components (UHF) from the first frequency tripler (output of 120 MHZ) is directed to a second frequency doubler with a 240 MHZ output, followed by a second frequency tripler with a 720 MHZ output, and a higher frequency amplifier, and then through higher frequency RF watt meter 20B (UHF), after which a shielded coaxial cable 12B transmits the higher radio frequency of 720 MHZ (UHF) to the one-half wavelength circular higher frequency antenna 3A within enclosure 1A for impinging on water surfaces located within enclosure 1A. It is the disturbance of the two original radio frequencies (120 MHZ and 720 MHZ in the example herein above), in addition to that of the two radio frequencies created by the heterodyning within the enclosure 1A (840 MHZ representing the sum of the two original radio frequencies, and 600 MHZ representing the difference of the two original radio frequencies) that randomly overlap with another to create infinitesimally small spacings that are able to fracture the ion bonds in the water surface or surfaces within the shielded and grounded enclosure 1A, thereby releasing hydrogen gas and oxygen in a clean, odorless, and silent operation.

Figure 4:
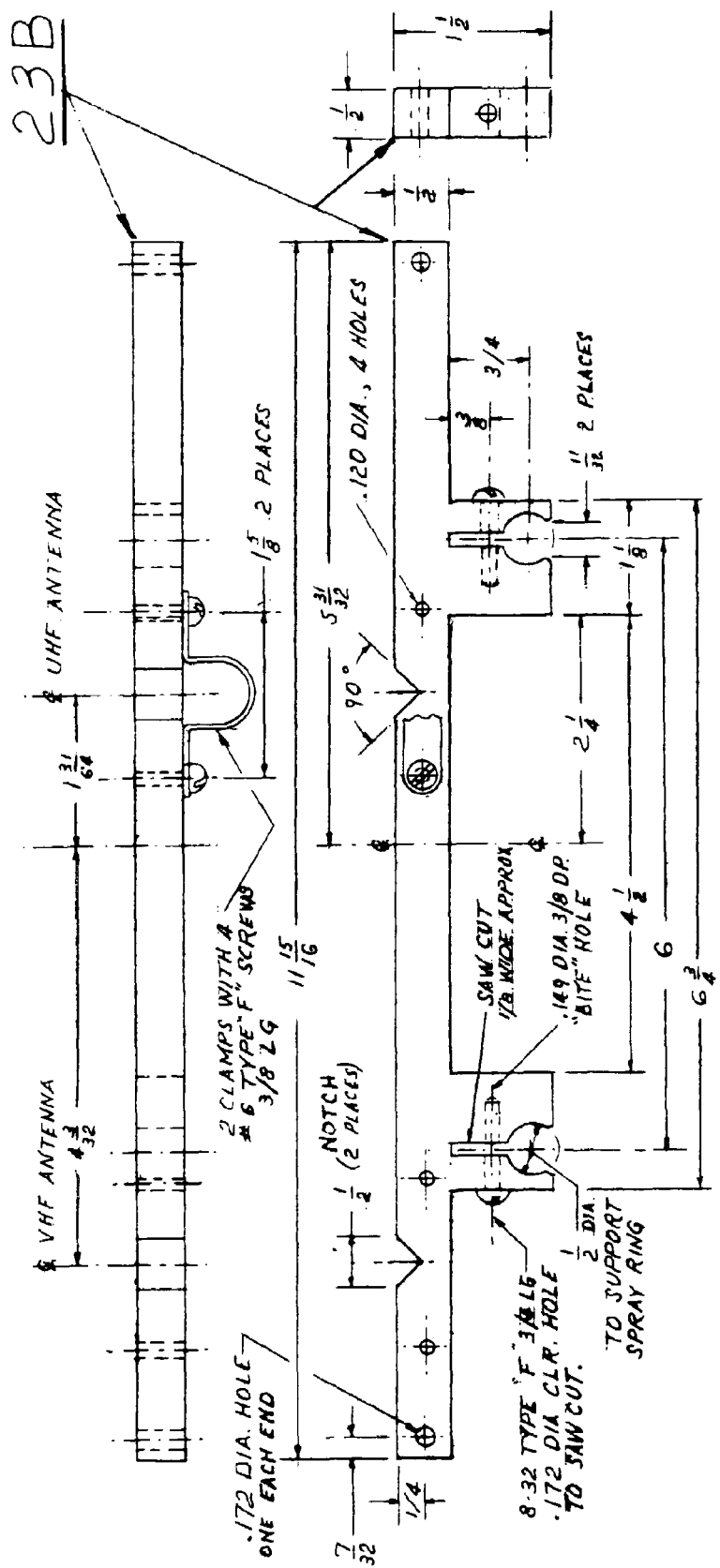
FIG. 4 contains top, side, and end views of the preferred bracket used to hold antennae within the heterodyning enclosure of the most preferred embodiment of the present invention.

FIG. 4 contain three views of a preferred bracket 23B used to hold antennae 2A and 3A in place within the heterodyning enclosure 1A of the most preferred embodiment of the present invention. The upper illustration is a top view of preferred bracket 23B, while the lower illustration is a front view, with the smaller illustration of the right side being an end view. FIG. 4 shows preferred bracket 23B having multiple un-numbered features, including but not limited to holes, saw cuts, clamps, and upper surface notches. However, the structure of preferred bracket 23B is not critical as long as it can fulfill its intended function of supporting UHF antenna 3A, VHF antenna 2A, and spray ring 5A. Dimensions are also included in FIG. 4 for the positioning of antennae 2A and 3A, as well as spray ring 5A and preferred bracket 23B, within an enclosure 1A having a internal volume of approximately five gallons.

I claim:

1. A clean and odorless system configured to use heterodyned radio frequencies to disrupt the ion bonds present in water molecules between the oxygen atom and its two adjoined hydrogen atoms to create hydrogen and oxygen gases, and wherein no noxious fumes or chemical residue are created as a result thereof, said system comprising:

a shielded and grounded heterodyning enclosure;

a water reservoir and pump means configured to provide a regulated supply of water to said enclosure, said water reservoir and pump means in fluid communication with said enclosure;

gas collection means configured to separate hydrogen gas from oxygen gas, said gas collection means positioned above said enclosure and in fluid communication with said enclosure;

electronic control means configured to provide generation of at least one high radio frequency in the UHF radio bandwidth and at least one low radio frequency in the VHF radio bandwidth;

antenna means configured to impinge said at least one high radio frequency in the UHF radio bandwidth and said at least one low radio frequency in the VHF radio bandwidth against one another and also against a surface of the water within said enclosure, wherein the impinging causes said at least one high radio frequency in the UHF radio bandwidth and said at least one low radio frequency in the VHF radio bandwidth to heterodyne and create two additional radio frequencies, one at the sum of said at least one high radio frequency and said at least one low radio frequency, and the other at their difference, said antenna means positioned within said enclosure above the surface of the water within said enclosure; and shielded electronic connection means configured to provide electronic communication between said electronic control means and said antenna means and to deliver said at least one high radio frequency in the UHF radio bandwidth and said at least one low radio frequency in the VHF radio bandwidth to said antenna means, wherein when said water reservoir and pump means moves the water into said heterodyning enclosure and said at least one high radio frequency in the UHF radio bandwidth and said at least one low radio frequency in the VHF radio bandwidth are made to impinge against one another and the surface of the water, said at least one high radio frequency in the UHF radio bandwidth and said at least one low radio frequency in the VHF radio bandwidth heterodyne by randomly overlapping one another within said enclosure to create two additional radio frequencies, one at the sum of said at least one high radio frequency and said at least one low radio, and the other at their difference, wherein said at least one high radio frequency in the UHF radio bandwidth, said at least one low radio frequency in the VHF radio bandwidth, said radio frequency created at their sum, and said radio frequency created at their difference, cause the ion bonds between the oxygen atom and its two associated hydrogen atoms in the water molecule to fracture and form hydrogen and oxygen gases which are thereafter separated one from the other by said gas collection means.

2. The device of claim 1 further comprising spray means configured to increase surface area of water introduced into said enclosure, said spray means being located within said enclosure.

3. The device of claim 2 wherein said spray means comprises plastic tubing configured for generation of a water spray curtain.

4. The device of claim 1 wherein said gas collection means comprises a a manifold and separate outlets connected to said manifold that are configured for hydrogen and oxygen transport away from said enclosure.

5. The device of claim 1 further comprising water level control means within said enclosure.

6. The device of claim 1 wherein said enclosure comprises a shielded container and a shielded top cover, and further wherein said shielded container and said shielded top cover are connected by at least one conductive gasket and latching means.

7. The device of claim 6 further comprising a center cover connected to said shielded container and said shielded top cover by at least two conductive gaskets and said latching means.

8. The device of claim 1 further comprising water heating means in thermal communication with said water reservoir and pump means.

9. The device of claim 1 further comprising base means adapted for securely supporting said water reservoir and pump means, said enclosure, and said electronic control means.

10. The device of claim 1 wherein said shielded electronic connection means comprises at least two shielded coaxial cable inputs.

11. A clean and odorless system configured to use heterdyned radio frequencies for disrupting the ion bonds present in water molecules between the oxygen atom and its two adjoined hydrogen atoms to create hydrogen and oxygen gases, and wherein no noxious fumes or chemical residue are created as a result thereof, said system comprising:

a shielded and grounded heterodyning enclosure with a latched top cover and water level control means;

gas collection means connected to said top cover, said gas collection means being adapted for separating oxygen and hydrogen gases from one another and transport thereof away from said enclosure;

a water reservoir;

a pump connected between said reservoir and said enclosure, and configured to transport a regulated supply of water from said reservoir to said enclosure;

at least one high frequency antenna positioned within said enclosure above a surface of the water within said enclosure, said at least one high frequency antenna also configured for introducing at least one high radio frequency in the UHF bandwidth into said heterodyning enclosure;

at least one low frequency antenna positioned within said enclosure above the surface of water within said enclosure, said at least one low frequency antenna also configured for introducing at least one low radio frequency in the VHF bandwidth into said heterodyning enclosure;

electronic control means, said electronic control means configured to provide from a single oscillator source generation of at least one high radio frequency in the UHF radio bandwidth for introduction into said heterodyning enclosure by said at least one high frequency antenna and at least one radio frequency bandwidth in the VHF radio bandwidth for introduction into said heterodyning enclosure by said at least one low frequency antenna; and at least two shielded coaxial cable inputs, with at least one of said shielded coaxial cable inputs connected between said electronic control means and said at least one high frequency antenna, and with at least one of said shielded coaxial cable inputs connected between said electronics control means and said at least one low frequency antenna, wherein when said electronic control means is connected to a power supply, and the water is also transferred from said reservoir into said enclosure by said pump, said high radio frequency in the UHF bandwidth from said at least one high frequency antenna and said low radio frequencies in the VHF bandwidth from said at least one low frequency antenna are made to sufficiently impinge against one another and the surface of the water in said enclosure to heterodyne by randomly overlapping one another to create two additional radio frequencies, one at the sum of said at least one high radio frequency and said at least one low radio frequency, and the other at their difference, wherein said at least one high radio frequency in the UHF radio bandwidth, said at least one low radio frequency in the VHF radio bandwidth, said radio frequency created at their sum, and said radio frequency created at their difference, cause the ion bonds between the oxygen atom and its two associated hydrogen atoms in the water molecule to fracture and form hydrogen and oxygen gases which thereafter are separated one from the other by said gas collection means.

12. The device of claim 11 further comprising plastic tubing within said enclosure that is configured for generation of a water spray curtain to increase the amount of water surface within said enclosure.

13. The device of claim 11 further comprising a center cover connected to said top cover and said enclosure by at least two conductive gaskets and at least one latch.

14. The device of claim 11 further comprising water heating means in thermal communication with said reservoir.

15. The device of claim 11 further comprising base means adapted for securely supporting said reservoir, said pump, said enclosure, and said electronic control means.

* * * * *